United States Patent [19]

Tokumoto et al.

[11] Patent Number: 4,710,526
[45] Date of Patent: Dec. 1, 1987

[54] ALKALINE CURING EMULSIONS FOR USE IN CEMENT ADMIXTURES

[75] Inventors: Minoru Tokumoto, Nara; Motoyuki Takagi; Shizuo Shitaoka, both of Osaka, all of Japan; Samuel Gold, Watchung; Carmine P. Iovine, Bridgewater, both of N.J.

[73] Assignee: National Starch and Chemical Corporation, Bridgewater, N.J.

[21] Appl. No.: 878,441

[22] Filed: Jul. 2, 1986

[51] Int. Cl.$^4$ .................................................. C08K 3/22
[52] U.S. Cl. ...................................... 524/5; 526/292.2; 526/292.95
[58] Field of Search ............. 524/5; 526/292.2, 292.95

[56] References Cited

U.S. PATENT DOCUMENTS 3,694,393  9/1972  Lewis et al. ........................ 524/815

*Primary Examiner*—Paul R. Michl
*Assistant Examiner*—Alex H. Walker
*Attorney, Agent, or Firm*—Margaret B. Kelley; Edwin M. Szala

[57] ABSTRACT

A cement admixture which results in a cement mortar with excellent adhesion to various adherents and with excellent flexibility over a wide range of temperatures, including very low temperatures, contains cement, optionally but preferably sand, and an effective amount of an aqueous emulsion of a cationic acrylate polymer having a Tg between below 10° C. and −40° C. The polymer comprises (a) about 25 to 85% of an acrylate monomer (e.g., butyl acrylate, methylmethacrylate, or 2-ethylhexyl acrylate but not methyl or ethyl acrylate), (b) about 0.5–15% of an alkaline-curable cationic quaternary ammonium salt monomer, and optional monomer(s) other than (a) or (b). The alkaline-curable cationic quaternary ammonium salt units in the polymer are represented by the formula

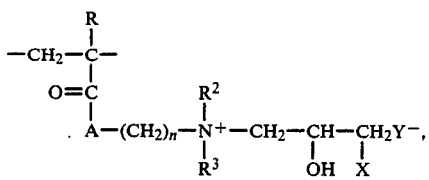

where R is hydrogen or a methyl group; $R^2$ and $R^3$ may be the same or different and are a methyl or ethyl group: A is —O— or —NH—; X is chlorine, bromine, or iodine; Y is an organic or inorganic monovalent anion; and n is 2 or 3.

18 Claims, No Drawings

ALKALINE CURING EMULSIONS FOR USE IN CEMENT ADMIXTURES

BACKGROUND OF THE INVENTION

This invention relates to cement admixtures containing an aqueous emulsion of an alkaline-curable polymr. The resulting cement mortars have excellent adhesion, flexibility, and waterproofing properties.

Aqueous emulsions of synthetic polymers have been added to cement admixtures which are used for the surface finishing of buildings or structures. The resulting cement mortars have shown improvements in adhesion, crack-resistance, impact-resistance, abrasion-resistance, flexibility, and waterproofing properties. The aqueous emulsions used have included synthetic rubber latex, acrylate emulsion, ethylene-vinyl acetate emulsion, and ethylene-vinyl chloride emulsion. Of these, the synthetic rubber latices are excellent in water- and alkali-resistance, but unsatisfactory in ozone-resistance, heat-resistance, and weather-resistance. Hence, they do not provide satisfactory cements. Ethylene-vinyl acetate emulsions provide good adhesion but are poor in water-resistance, alkali-resistance, and weather-resistance. Ethylene-vinyl chloride emulsions have good adhesion and alkali-resistance, but are poor in heat-resistance and weather-resistance. Acrylate emulsions have a good balance of properties and have been widely used to provide the best cement admixtures.

Although acrylate emulsions have been used widely, attempts have been made to improve their performance, specifically to improve the adhesion of the cement mortar. One such attempt has been the introduction of carboxyl and epoxide groups into an acrylate polymer by polymerization with ethylenically unsaturated monomers containing such groups. Another attempt has been the introduction of a cationic charge into an acrylate polymer by polymerization with an ethylenically unsaturated cationic monomer such as alkylaminoethylmethyacrylate. However, in some cases, the adhesion of the resulting cement mortar to certain adherents is still unsatisfactory, e.g., to adherents such as glazed ceramic tiles, plastic floor surfaces (epoxy resin, urethane resin, polyvinyl chloride, and the like), asphalt, concrete, steel, and plywood, as well as old and weathered concrete and mortar.

In order to increase the flexibility of the cement mortar, acrylate polymers having a low Tg are added in large amounts. The use of the low Tg polymers results in poor adhesion due to low cohesive strength. There is also a limitation on the amount of polymer emulsion which can be added to the cement. Hence, good adhesion and good flexibility have not been obtained simultaneously using the same polymer emulsion.

SUMMARY OF THE INVENTION

The present invention provides a cement admixture which results in a cement mortar which has excellent adhesion to various adherents and which maintains excellent flexibility over a wide range of temperatures including very low temperatures. The cement admixture comprises an effective amount of a cement and a aqueous emulsion of an acrylate polymer having a Tg below 10° C. to −40° C., which comprises a polymer of (a) about 25% to 99.5% of a hydrolytically-stable acrylate monomer, (b) about 0.5–15% of an alkaline-curable cationic quaternary ammonium salt monomer, (c) 0–70% of a hydrolytically-stable monomer other than (a) or (b), and (d) 0–30% of a hydrolytically-unstable monomer other than (a) or (b) with the percentages being by weight and totaling 100%; the acrylate units in the polymer beingrepresented by the formula

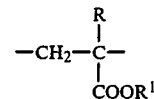

and with the alkaline-curable cationic quaternary ammonium salt units in the polymer being represented by the formula

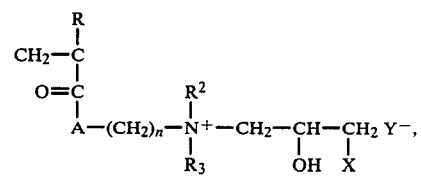

where R is hydrogen or a methyl group; $R^1$ is a $C_1$–$C_{12}$ alkyl group or a $C_6$–$C_{12}$ cycloalkyl group with the proviso that $R^1$ is not $C_1$ or $C_2$ when R is H; $R^2$ and $R^3$ may be the same or different and are a methyl or ethyl group; A is —O— or —NH—; X is chlorine, bromine, or iodine; Y is an organic or inorganic monovalent anion; and n is 2 or 3. The practitioner will recognize that the halohydrin group

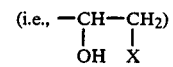

will be in epoxide form

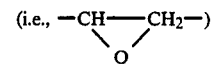

under alkaline conditions.

Aqueous emulsions of the above alkaline-curable cationic acrylate resins are effectively absorbed by the anionically charged cement particles. The cement and polymer particles are evenly distributed. The functional group

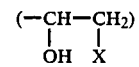

on the particle surface of the polymer are crosslinked in the presence of the alkaline cement. When the cement is used as a mortar, it contains sand. When the cement is used as a paint, it may or may not contain a fine sand. The resulting cement mortar shows high adhesive strength even with difficult bonding surfaces. The resulting cement paint shows improved flexibility and adhesion. Thus, it is possible to improve the low temperature flexibility without reducing the adhesive strength.

Typical alkyl or cycloalkyl acrylates or methacrylates include methyl methyacrylate, ethyl methacrylate, propyl acrylate or methacrylate, butyl acrylate or methacrylate, amyl acrylate or methacrylate, hexyl acrylate or methacrylate, 2-ethylhexyl acrylate or methacrylate, n-octyl acrylate or methacrylate, decyl acrylate or methacrylate, lauryl acrylate or methacrylate, and cyclohexyl acrylate or methacrylate. These can be used alone or in combination. If necessary, other monomers which can be copolymerized with the above-described monomers can be included. These include hydrolytically-stable monomers such as styrene and its derivatives, acrylonitrile or methacrylonitrile, acrylic acid or methacrylic acid, vinyl pyridine, vinyl pyrrolidinone, hydroxyalkyl acrylate or methacrylate and its derivatives, alkyl amino acrylate or methacrylate, N,N'-dialkyl acrylamide or methacrylamide, dimethylaminopropyl acrylamide or methacrylamide in amounts up to about 70% by weight. Hydrolytically-unstable monomers such as methyl acrylate, ethyl acrylate, vinyl acetate, vinyl chloride, and vinyl ethers may also be used in amounts which do not affect the hydrolytic stability of the polymer, e.g., up to 30% by weight. The term "hydrolytically-stable monomer", as used herein, means a monomer which does not hydrolyze at a pH above 11.

The preferred polymers contain about 40–60%, most preferably 50% methylmethacrylate or styrene, 40–60%, most preferably 50%, butyl acrylate, 1–10% of the cationic monomer, and optionally 2-ethylhexyl acrylate, with the percentages totaling 100% and being selected to give a polymer within the preferred Tg range of 0° to −10° C.

The alkaline-curable cationic quaternary ammonium monomers useful herein are the adducts of an epihalohydrin and a dialkylaminoalkyl acrylamide or methacrylamide (where A is —NH—) or acrylate or methacrylate (where A is —O—). These cationic halohydrin-containing monomers are described in U.S. Pat. No. 3,095,390 issued June 25, 1963 to A. Maeder (which covers the methacrylamides) and U.S. Pat. No. 3,694,393 issued Sept. 26, 1972 to S. N. Lewis (which covers the methacrylate). Typical adducts include adducts dimethylaminoethyl acrylate or methacrylate, diethylaminoethyl acrylate or methacrylate, dimethylaminopropyl acrylate or methacrylate, diethylaminoethyl acrylamide or methacrylamide, diethylaminopropyl acrylamide or methacrylamide, and the like. The monomers are used in the salt form. Various salts are suitable. Typical inorganic anions include chloride, bromide, sulfate and nitrate. Typical organic anions include acetate, benzosulfonate and lauryl sulfonate. The preferred monomers are the chlorides or nitrates of dimethylaminoethyl methacrylate, dimethylaminopropyl methacrylate, and dimethylaminopropyl methacrylamide. They are easy to manufacture or purchase and give acrylate polymers having good performance.

The amount of quaternary ammonium salt monomer used is preferably 0.5–15%, preferably 1–10%, by weight of the total polymer. Below 0.5% the improvement in adhesion and flexibility is insufficient and above 15%, the crosslinking density is too great, causing the polymer, and consequently the cement mortar, to become brittle.

The aqueous emulsions herein can be prepared by known polymerization methods, that is, by charging the above monomers with an initiator into a reactor with an agitator and a jacket for controlling the temperature and polymerizing at 50°–80° C. and atmosphere pressure for 3–8 hrs. Conventional initiators and other polymerization additives such as surfactants and/or protective colloids may be used.

As the initiator, a peroxide or a combination of a peroxide and reducing agent typically is used. The preferred peroxides include: potassium sulfate, ammonium persulfate, sodium persulfate, or hydrogen peroxide. The preferred reducing agents include sodium bisulfite, sodium hydrosulfite and ferrous salts (e.g., ferrous sulfate/tartaric acid). The thiosulfate initiators are employed in known catalytic amounts, preferably about 0.02–5% by weight based on the weight of the total monomers.

As surfactants, all conventional types can be used; however, it is preferable to use a nonionic or cationic surfactant in order to provide the desired performance of the acrylate polymer. The preferred nonionic surfactants include polyoxyethylene alkyl ether, polyoxyethylene alkylphenol ether, and oxyethylene oxypropylene block copolymers. The preferred cationic surfactants include lauryl trimethyl ammonium chloride and alkylbenzyl dimethyl ammonium chloride. Although anionic surfactants are not as effective as the nonionic or cationic surfactants, they can be used. Suitable anionic surfactants are an alkali salt of a higher alcohol sulfate, alkali salt of alkylbenzene sulfonate, alkali salt of alkylnaphthalene sulfonate, alkali salt of polyoxyethylene alkyl sulfate, or alkali salt of polyoxyethylene alkylphenyl sulfate.

As protective colloids, most of the known water soluble polymers can be used. These include fully or partially hydrolyzed polyvinyl alcohol, an alkali salt of a fully or partially hydrolyzed sulfonated polyvinyl alcohol, cellulose derivatives such as methyl cellulose and hydroxyethyl cellulose, polyethylene glycol, and polypropylene glycol. The amount of protective colloid is preferably 0.2–10%, more preferably 2–5%, by weight based on the total weight of the monomers.

Buffering agents, preferably phosphoric acid, sodium bicarbonate, potassium bicarbonate, sodium pyrophosphate, potassium pyrophosphate, sodium phosphate, and sodium acetate may be used. The amount used is preferably 0–5% by weight based on the total weight of the monomer(s).

The resulting polymers are dispersed in water thus forming an emulsion. The preferred particle size is 0.1–1 micron. The polymer content (i.e., solids) in the emulsion is preferably 20–70% by weight. The Tg of the acrylate polymers is controlled by the carbon chain length of the alkyl group (i.e., $R^1$) in the acrylate or methacrylate monomer. The polymer should have a theoretical Tg below 10° C., preferably below 0° C., and most preferably −10° C. or below. The acrylate polymers become brittle when their Tg is over 10° C. and consequently, the flexibility of the cement mortar is not improved. Thus, it is necessary to keep the Tg below 10° C.

However, acrylate or methacrylate polymers having a Tg above 10° C. can be used if sufficient plasticizer is added so that the apparent Tg of the plasticized polymer composition is lowered to below 10° C. For the purposes herein, these plasticized aqueous polymer emulsions are considered the equivalent of the non-plasticized polymer emulsions containing polymers have the required Tg. The plasticizer can be added at the same time the raw materials are charged to the reactor or can be added after the polymerization reaction has been completed. The preferred plasticizers include dibutyl phthalate, dioctyl phthalate, trimethyl penta diol mono-iso-butyrate, trimethyl penta diol di-iso-butyrate, and butyl carbitol. The amount of plasticizer used is below 20% by weight, based on the total weight of the polymer. It is preferable to minimize the amount used.

With respect to the lower limit for the Tg of the polymers, if it is below −40° C., the main chain of the the polymer becomes too soft and sufficient mechanical strength is not obtained even after the curing has taken place. Hence, the preferred lower limit for the Tg is −40° C., more preferably −30° C.

The cement admixture herein is manufactured by mixing the aqueous polymer emulsion, cement, and, if necessary, other additives. All known cements are suitable for use herein, i.e., Portland cement, rapid hardening cement, ultra rapid hardening cement, aluminum cement, jet cement, Portland blast furnace cement, Pozzolan cement, sulfate-resistant cement and white Portland cement. Fillers are used when necessary, and the preferred fillers include silica sand, crushed sand, blast furnace slag sand, sea sand, Perlite, calcium carbonate, asbestos, alkali-resistant glass fiber, steel fiber, carbon fiber, fly ash, titanium dioxide, and iron ore sand. The addition of a defoamer makes it possible to obtain high density cement mortars. The amount of defoamer used is preferably 0–5%, based on the aqueous emulsion. If a pigment is desired, iron oxide red and carbon black are preferred.

Typical cement mixing methods are suitable for mixing the above aqueous polymer emulsion and the cement. For example, the cement, emulsion, and necessary fillers (depending upon the end use) are mixed in a conventional mixer such as an electric mixer, a paint disperser, or a mortar mixer. In this case, the emulsion can be diluted previously with part or all of the water to be added as mixing water for the cement. The amount of polymer emulsion used should be sufficient to provide 1–200% of polymer solids based on the cement solids weight. The appropriate mixing ratio is selected within this range according to the use for the cement mortar composition. For example, when the adhesion is to be increased, 1–40%, preferably 5–25%, is appropriate. When flexibility is to be provided, 25–200%, preferably 40–100%, is appropriate. Even though the mixing of the polymer emulsion and cement is carried out at room temperature, the curing reaction does not take place immediately, but follows the rate of the cement hydration reaction.

In the typical cement mortar the ratio of cement to sand to polymer solids is 1 to 0.5–4.0 to 0.05–0.25, whereas in the typical cement paint the ratio is 1 to 0–1 to 0.1–1. The resulting cement admixtures are suitable for use on various types of adherent surfaces, such as concrete structural walls, concrete floors, waterproofing cement mortars, elastic cement coatings, weathered ceramic tile surfaces, steel floors, or steel pipe surfaces. They are also suitable for joint sealing of concrete, autoclaved light weight concrete, and ceramic tile. They may be applied in the same manner as the usual cement finishing methods, e.g., by the use of trowel, brush, or spray gun. The amount applied will depend upon the use, typically a thick coating (1–50 mm) is applied when the cement is used as a mortar and thin coating (1–2 mm) is applied when the cement is used as a paint. The curing of the cement admixture is carried out in air or in moist air.

When the cement admixture herein is coated on the adherent, the water in the cement admixture is decreased by hydration of the cement, by evaporation, and even by being absorbed into the adherent when the adherent has water absorbing capability. Upon loss of water the polymer particles, cement particles, and optional fillers become more intimately in contact with each other. The acrylate polymers herein have many cationic groups on the surface of the acrylate polymer particles. The particles are more strongly cationically charged than those polymers containing added cationic surfactants or protective colloids, as well as those cationic polymers containing no alkaline-curable groups (e.g., alkylaminoethylmethylacrylate). The particles, therefore, are absorbed and fused more effectively with the anionic cement particles and fillers.

The cement admixture herein provides flexibility and good adhesion which is not reduced by changes in temperature. Because the polymer has a Tg of below 10° C. it is rather soft, and the hardened cement shows excellent flexibility, not only at ordinary temperatures, but also at low temperatures.

In the examples which follow, the parts are by weight, the Brabender viscosity is determined at 30° C., and the reported Tg values are theoretical (i.e., calculated) values rather than actual Tg values.

EXAMPLE I

This example describes the preparation of an aqueous emulsion of an acrylate polymer (MMA/2-EHA) containing an alkaline-curable cationic quaternary ammonium salt monomer. It compares the performance of a cement mortar containing this polymer emulsion with cement mortars containing aqueous emulsions of comparative acrylate resins.

Part A—Alkaline-Curable Acrylate Emulsion

The following were charged to a 2 liter reactor equipped with an anchor-shaped agitator:

|  | Parts |
|---|---|
| Initial Charge | |
| Polyoxyethylene nonylphenol (20 moles EO*) | 5 |
| Sodium hydrogen phosphate | 0.5 |
| Ammonium persulfate | 0.5 |
| Hydroxyethyl cellulose (as a 2% solution having a viscosity of 10 cps.) | 3 |
| Water | 100 |
| Total | 109 |
| Monomer Charge | |
| Methyl methacrylate (MMA) | 32 |
| 2-Ethylhexyl acrylate (2-EHA) | 65 |
| Nitrate salt of Dimethylaminopropyl methacrylate/ Epichlorohydrin adduct (DMAPMA/Epi.NO₃) (90% soln.) | 3.3 |
|  | 100.3 |

*EO-ethylene oxide

The initial aqueous solution was charged to the reactor, heated to 75° C., and maintained at this temperature while the monomer charge was slowly added over 3 hours. After the slow addition was completed, heating was continued for 1 hr. The emulsion had a solids content of 51%, viscosity of 3500 cps., and pH of 2.2. The Tg of the polymer was −14° C. Using this alkaline-curable cationic acrylate polymer emulsion, a cement mortar was formulated as follows:

|  | Parts |  |
|---|---|---|
| Portland cement | 100 | |
| Standard sand | 300 | |
| Acrylate emulsion | 39.2 | (20 as polymer solids) |
| Defoamer NOPCO NXZ | 1 | |
| Water | 45 | |

It was poured into a 4.5×4.5×0.5 cm. frame placed on top of a 7.5×7.5×0.5 cm. glazed semi-porcelin tile and air cured for three weeks under standard conditions (20° C., 65% relative humidity).

Part B—Comparative Acrylate Emulsions

An emulsion (B-1) of a commercially available cationic acrylate polymer, i.e., dimethylaminoethyl methacrylate/2-ethylhexyl acrylate/methyl methacrylate (DMAEMA/2-EHA/MMA), was used in place of the polymer emulsion of Part A. The amount used was sufficient to provide 20 parts by weight of polymer solids. The emulsion had a solids content of 40%, viscosity of 150 cps., and pH of 5.4. The Tg of the polymer was −5° C.

An emulsion (B-2) of a commercially available anionic acrylate polymer, i.e., acrylic acid/2-ethylhexyl acrylate/styrene (AA/2-EHA/St) was used in place of the polymer emulsion of Part A. It was used in an amount sufficient to provide 20 parts by weight of polymer solids. The emulsion had a solids content of 58%, viscosity of 700 cps., and pH of 8. The Tg of the polymer was −20° C.

The tensile butt adhesive strength of the three assemblies was measured using a Kenken type tester. The results are shown in Table I.

TABLE I

| Polymer Emulsion | Adhesive (kg./cm.²) Strength | Breaking Behavior (% failure) | |
|---|---|---|---|
| | | Interface | Mortar or adherent |
| Part A | 6.8 | 0 | 100 |
| Part B-1* | 3.1 | 90 | 10 |
| Part B-2* | 2.6 | 100 | 0 |

*Comparative

The results show that the cement mortar containing the alkaline curable quarternary ammonium salt monomer had excellent adhesion. The comparative acrylate polymers which had a Tg below 10° C. and one of which was cationic, showed much poorer adhesion. The results also show that the cement mortar containing the alkaline-curable monomer failed in cohesive strength (i.e., failed in the mortar or adherent) rather than at the interface with the adherent, whereas the cement mortar containing the comparative acrylate polymers failed in adhesive strength (i.e., failed at the interface).

EXAMPLE II

The polymerization was carried out as in Example I except that the initial charge was as shown below and the monomer charge was as indicated in Table II.

| Initial Charge | Parts |
|---|---|
| Polyoxyethylene octylphenol (15 moles EO) | 5.0 |
| Polyoxyethylene octylphenol (35 moles EO) | 5.0 |
| Potassium persulfate | 0.5 |
| Sodium hydrogen phosphate | 1.0 |
| Water | 100 |
| Total | 111.5 |

TABLE II

| | Monomer Composition (parts) | | | | | Properties of | | | Polymer |
|---|---|---|---|---|---|---|---|---|---|
| | | | | | | Emulsion | | | |
| No. | DMAEMA/Epi. Adduct (90% Chloride soln.) | MMA | BA | 2-EHA | St | Solids (%) | Visc. (cps.) | pH | Tg (°C.) |
| 2* | 0 | 30 | 70 | | | 51.5 | 450 | 2.7 | −11 |
| 3 | 0.55 | 29.5 | 70 | | | 51.4 | 430 | 2.5 | −13 |
| 4 | 1.1 | 29.0 | 70 | | | 51.3 | 440 | 2.6 | −14 |
| 5 | 3.3 | 27.0 | 70 | | | 50.9 | 460 | 2.7 | −14 |
| 6 | 8.8 | 22.0 | 70 | | | 50.8 | 550 | 2.5 | −15 |
| 7 | 11.0 | 20.0 | 70 | | | 50.6 | 300 | 2.7 | −16 |
| 8 | 15.6 | 16.0 | 70 | | | 50.6 | 290 | 2.6 | −16 |
| 9 | 4.4 | | 70 | | 26 | 51.6 | 610 | 2.6 | −12 |
| 10** | 5.5 | 47 | | 48 | | 50.9 | 420 | 2.7 | +13 |
| 11** | 5.5 | 5 | 90 | | | 50.7 | 490 | 2.6 | −48 |

*Comparative - no alkaline-curable monomer
**Comparative - outside Tg range
The DMAEMA/Epi adduct is an adduct of dimethylaminoethyl methacrylate and epichlorohydrin.

Using the resulting emulsions, cement mortars were formulated as follows:

| | Parts |
|---|---|
| Rapid hardening cement | 100 |
| Silica sand (No. 6) | 100 |
| Silica sand (No. 7) | 100 |
| Silica sand (No. 8) | 100 |
| Polymer emulsion | 20 (polymer solids) |
| Defoamer | 0.5 |
| Water | 50 |

The mortars were poured onto four different adherents and cured for two weeks under the standard conditions. The adherents and their dimensions were as follows:

| | |
|---|---|
| SS41 Steel | (6.0 × 9.0 × 0.9 cm) |
| Plywood lauan | (7.5 × 7.5 × 0.9 cm) |
| Semi-porcelain tile | (7.5 × 7.5 × 0.5 cm) |
| Cement mortar brick | (7.0 × 7.0 × 2.0 cm) |

The adhesive test results are shown in Table III. The assemblies other than the plywood assembly were subjected to an aging test which involved the following cycles: submersion in water for 2 days at room temperature followed by drying for 2 days at 80° C.; after 5 such cycles the assembly was cured for 1 week under standard conditions. The sample designated No. 12 was obtained by modifying the polymer emulsion designated No. 10 with 5% of the plasticizer dibutyl phthalate to lower the apparent Tg of the emulsion from +13° to 0° C.

TABLE III

| No. | Steel Air-Cured | Steel After Aging | Semi porcelain Air-Cured | Semi porcelain After Aging | Cement mortar Air-Cured | Cement mortar After Aging | Plywood Air-Cured | Plywood After Aging |
|---|---|---|---|---|---|---|---|---|
| 1[2][2] | 5.7 | 8.3 | 4.1 | 1.2 | 5.4 | 8.6 | 4.0 | — |
| 3 | 10.6 | 16.7 | 6.0 | 5.6 | 11.7 | 15.6 | 8.6 | — |
| 4 | 12.2 | 17.8 | 6.4 | 5.9 | 13.2 | 17.2 | 9.0 | — |
| 5 | 13.0 | 18.0 | 7.6 | 6.1 | 13.9 | 18.7 | 9.2 | — |
| 6 | 14.1 | 19.2 | 7.2 | 5.8 | 15.2 | 20.6 | 9.5 | — |
| 7 | 13.2 | 19.0 | 8.0 | 6.0 | 14.9 | 18.6 | 8.0 | — |
| 8 | 9.0 | 4.4 | 6.4 | 3.1 | 16.6 | 9.0 | 8.8 | — |
| 9 | 14.9 | 18.6 | 6.8 | 5.9 | 13.4 | 18.1 | 8.6 | — |
| 10** | 16.8 | 8.0 | 7.8 | 2.4 | 19.2 | 9.3 | 8.8 | — |
| 11** | 10.1 | 12.0 | 5.2 | 5.0 | 11.1 | 10.5 | 9.0 | — |
| 12*** | 14.4 | 13.9 | 7.0 | 6.0 | 18.2 | 17.2 | 8.1 | — |

*Comparative - no alkaline-curable monomer
**Comparative - outside Tg range
***Same as No. 10 but modified with plasticizer The results show that the cement admixtures containing the alkaline-curable cationic quaternary ammonium salt monomers had excellent adhesion to all adherents. The comparative cement admixture (see No. 2), in which a typical acrylate polymer emulsion i.e., an emulsion containing a polymer with no alkaline-curable polymer, was used showed both poor initial adhesion and poor adhesion after aging. The results also show that even when the alkaline-curable cationic quaternary ammonium salt monomer was used, if the Tg is above 10° C. (see No. 10), the adhesion after aging was unsatisfactory. When this polymer was used with the plasticizer, it was satisfactory (see No. 12). The results further show that an alkali-curable polymer with too low a Tg was inferior to the higher Tg polymers (see No. 11). The appropriate Tg range for the polymer is thus demonstrated.

EXAMPLE III

The polymerizations were carried out as in Example II using the monomers shown in Table IV.

TABLE IV

| Monomer Composition | 13 | 14* | 15* | 16* | 17* |
|---|---|---|---|---|---|
| Nitrate Salt of Dimethylaminoethyl methacrylate/Epichlorohydrin adduct (DMAEMA/Epi.NO$_3$). (90% Nitrate soln.) | 3.3 | — | — | — | — |
| Methyl methacrylate (MMA) | 27 | 27 | 25 | 27 | 26 |
| 2-Ethylhexyl acrylate (2-EHA) | 70 | 70 | 70 | 70 | 70 |
| Other monomer** | — | 3 AA | 5 GMA | 3 DMAEA | 4 DMAPMAm |
| Properties of the emulsion and polymer | | | | | |
| Solids (%) | 50.5 | 50.8 | 50.7 | 51.0 | 50.7 |
| Viscosity (cps.) | 300 | 810 | 240 | 280 | 250 |
| pH | 2.6 | 2.4 | 2.5 | 2.8 | 2.7 |
| Tg (°C.) | −23 | −23 | −25 | −22 | −24 |

*Comparative
**AA is acrylic acid; GMA is glycidyl methacrylate; DMAEA is dimethylaminoethyl acrylate; DMAPMAm is dimethylaminopropyl methacrylamide.

Using the resulting polymer emulsions, the following cement admixtures (designated A and B) were formulated:

| | | Parts |
|---|---|---|
| (A) | Cement composition same as in Example II | |
| (B) | White Portland cement | 100 |
| | Calcium Carbonate | 50 |
| | Polymer emulsion | 100 (polymer solids) |
| | Methyl cellulose | 0.2 |
| | Defoamer | 3 |
| | Water | appropriate amount |

The cement admixtures were thoroughly agitated and cement paints were made. Films (1 mm thick) were formed by immediately casting the paint on a Teflon plastic plate. After curing for one month, the cement films were tested for tensile strength (maximum point) and elongation (% at break) at −10°, 20°, and 50° C. using an Instron tester at a tensile speed of 200 mm/min.

The results are shown in Tables V and VI. The emulsion designated No. 18 was prepared using a cationic surfactant in place of the alkaline-curable cationic quaternary ammonium salt monomer and the polymerization was carried out using methyl methacrylate/2-ethylhexyl acrylate (35/65) as the monomers and lauryltrimethylammonium chloride as the surfactant. The polymerization was carried out as in Example I.

TABLE V

Adhesion (kg/cm$^2$) of Cement A

| Adherent | Test Conditions | Polymer Emulsion No. 13 | 14* | 15* | 16* | 17* | 18* |
|---|---|---|---|---|---|---|---|
| Steel | Air-Cured | 12.7 | 12.0 | 13.0 | 11.6 | 13.2 | — |
| | After Aging | 17.2 | 13.6 | 8.8 | 9.0 | 8.8 | — |
| Semi porcelain tile | Air-Cured | 5.9 | 4.3 | 3.0 | 4.0 | 4.2 | — |
| | After Aging | 5.2 | 2.7 | 2.0 | 3.0 | 3.3 | — |

TABLE V-continued

| | | Adhesion (kg/cm²) of Cement A | | | | | |
|---|---|---|---|---|---|---|---|
| | | Polymer Emulsion No. | | | | | |
| Adherent | Test Conditions | 13 | 14* | 15* | 16* | 17* | 18* |
| Cement mortar | Air-Cured | 12.6 | 11.4 | 12.2 | 14.2 | 13.2 | — |
| | After Aging | 15.4 | 16.3 | 17.2 | 9.3 | 8.8 | — |
| Plywood (Lauan) | Air-Cured | 7.7 | 5.4 | 5.6 | 5.0 | 4.3 | — |
| | After Aging | — | — | — | — | — | — |

TABLE VI

| | Properties of Cement Film B | | | | | |
|---|---|---|---|---|---|---|
| | Emulsion No. | | | | | |
| | | 13 | 14* | 15* | 16* | 17* | 18* |
| Tensile strength (kg./cm.²) | −10° C. | 42.6 | 125 | 110 | 101 | 132 | 90.3 |
| | 20° C. | 12.6 | 15.2 | 13.6 | 9.0 | 10.6 | 5.0 |
| | 50° C. | 5.0 | 3.0 | 2.5 | 3.4 | 3.7 | 1.9 |
| Maximum elongation (%) | −10° C. | 220 | 40 | 30 | 105 | 90 | 105 |
| | 20° C. | 920 | 450 | 400 | 800 | 720 | 1100 |
| | 50° C. | 1940 | 2410 | 2200 | 2900 | 2500 | 2760 |

*Comparative

The results show that the cement admixture containing the alkaline-curable cationic quaternary ammonium salt monomer (No. 13) was superior not only in adhesion to various adherents but also in the balance of tensile strength and elongation in comparison to the typical cement compounds (Nos. 14–18). Additionally, the variation in properties within the temperature range of −10° C. to +50° C. are slight, and accordingly the composition can be applied over a wide range of temperatures. The typical cement admixtures showed a marked decrease in their performance after aging, whereas the cement admixture herein (No. 13) maintained the initial adhesion level. It is believed this difference is due to the flexibility of this cement mortar which allows for temperature variation. Typical cement mortars are not flexible.

EXAMPLE VI

The polymerization was carried out as in Example I except that the reaction temperature was 70°–75° C. and the slow addition time was 4 hours. The charges are described below:

| | Parts |
|---|---|
| Initial Charge | |
| Polyoxyethylene nonylphenol (20 moles EO) | 6.0 |
| Ammonium persulfate | 0.4 |
| Sodium dihydrogen phosphate | 0.5 |
| Water | 100 |
| Total | 106.9 |
| Monomer Charge | |
| Methyl methacrylate (MMA) | 10 |
| Styrene (St) | 15 |
| 2-Ethylhexyl acrylate (2-EHA) | 42 |
| Ethyl acrylate (EA) | 30 |
| Nitrate salt of Dimethyaminopropyl methacrylamide/Epichlorohydrin Adduct (70% Nitrate Soln.) (DMAPMAm/EPI.NO₃) | 4.3 |
| Total | 101.3 |

The emulsion had a solids content of 50.2%, viscosity of 400 cps., and pH of 3.1. The polymer had a Tg of −14° C.

Using the above emulsion, a cement mortar was formulated as follows:

| | |
|---|---|
| Rapid hardening cement | 100 |
| Silica sand (No. 7) | 100 |
| Silica sand (No. 8) | 100 |
| Silica sand (No. 9) | 100 |
| Resin emulsion | 30 (as polymer solids) |
| Defoamer | 2 |
| Water | Appropriate amount |

The flow value (determined according to ASTM C230-55T) of the final cement mortar was adjusted to 170 mm. It was poured onto a 5 year old epoxy-coated floor. It was smoothed to a thickness of 2–5 mm by troweling and cured for 1 week in air. The adhesion of the cement mortar to the surface was 8.4 kg/cm² after 7 days curing. Cements containing the comparative polymer emulsions B-1 and B-2 of Example I were also applied; their adhesion was poor (both 0 kg/cm²).

EXAMPLE VII

The polymerization was carried out as in Example I using the following:

| | Parts |
|---|---|
| Initial Charge | |
| Polyoxyethylene nonylphenol (25 moles EO) | 7.0 |
| Potassium persulfate | 0.6 |
| Water | 70 |
| Total | 77.6 |
| Monomer Charge | |
| Butyl methacrylate (BMA) | 15 |
| Styrene (St) | 10 |
| Ethyl acrylate (EA) | 25 |
| Butyl acrylate (BA) | 45 |
| Chloride salt of Dimethylaminoethyl methacrylate/ Epichlorohydrin adduct (DMAEMA/Epi.Cl) (90% soln.) | 5.5 |
| Total | 100.5 |

The emulsion had a solids content of 59.1%, viscosity of 1520 cps., and pH of 2.3. The polymer had a Tg of −18° C.

Using the above polymer emulsion, the following cement mortar was formulated:

| | |
|---|---|
| Rapid hardening cement | 100 |
| Silica sand (No. 7) | 100 |
| Polymer emulsion | 50 (polymer solids) |
| Defoamer | 3 |
| Water | appropriate amount |

The flow value of the cement mortar was adjusted to 200 mm. The fresh cement mortar was patched on the hollow places of asphalt mixed with concrete using a trowel and the surface was flattened. The cement mortar was cured for 1 week. A urethane coating for flooring was coated on the cement mortar with the thickness of the coating being 5 mm. After 1 year, the constructed portion were examined thoroughly; no degradation was detected. The adhesion to both the asphalt concrete resin and urethane resin was satisfactory. Similar evaluations were carried out with the comparative resins (B-1 and B-2 of Example I). The results were poor. The cement mortar swelled due to the absorbtion of water from the under layer. The surface of the coated urethane became uneven after 6 months.

EXAMPLE VIII (COMPARATIVE)

This example shows that the lower alkyl acrylates ($C_1$ and $C_2$) are poor in hydrolytic stability. A ethyl acrylate/2-ethylhexyl acrylate/dimethylaminopropyl methacrylamide/epichlorohydrin adduct as the chloride salt (87.7/9.7/2.6) having a Tg of $-28°$ was evaluated. A butyl acrylate/methyl methacrylate/acrylic acid (50/49/1) having a Tg of $+2°$ C. was also evaluated. The film weight minus loss (%) after immersion in alkali is shown below.

| Polymer | Days Immersion | | | | | |
|---|---|---|---|---|---|---|
| | 2 | 5 | 12 | 19 | 33 | 47 |
| EA/2-EHA/DMAPMAm.EPI.Cl | | | | | | |
| In saturated cement solution* | 1.1 | 1.7 | 1.8 | 2.3 | 2.5 | 2.8 |
| In 5% NaOH solution | 0.7 | 1.6 | 1.8 | 2.2 | 3.4 | 4.4 |
| BA/MMA/AA | | | | | | |
| In saturated cement solution* | 0.6 | 1.1 | 1.5 | 2.0 | 2.2 | 2.2 |
| In 5% NaOH solution | 0.2 | 1.1 | 1.5 | 2.0 | 2.2 | 2.2 |

*about pH 12

The results show that the butyl acrylate-based film showed better alkali-stability.

Now that the preferred embodiments of the invention have been described in detail, various modifications and improvements thereon will become readily apparent to those skilled in the art. Accordingly, the spirit and scope of the invention are to be limited only by the appended claims and not by the foregoing specification.

What is claimed:

1. A cement admixture comprising a cement and an effective amount of an aqueous emulsion of an acrylate polymer with a Tg between below 10° C. and $-40°$ C., the polymer comprising (a) about 25–85% of an acrylate or methacrylate monomer, (b) about 0.5–15% of an alkaline-curable cationic quarternary ammonium salt monomer, (c) 0–70% of a hydrolytically-stable monomer other an (a) or (b), and (d) 0–30% of a hydrolytically-unstable monomer other than (a) or (b) with the percentages being by weight and totaling 100%; wherein the acrylate unit in the polymer and has the formula

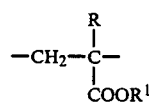

and the alkaline-curable cationic quarternary ammonium unit in the polymer has the formula

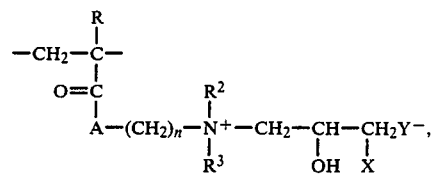

where R is hydrogen or a methyl group; $R^1$ is a $C_1$–$C_{12}$ alkyl group or a $C_6$–$C_{12}$ cycloalkyl group with the proviso that $R^1$ is not a methyl or ethyl group when R is hydrogen; $R_2$ and $R_3$ are methyl or ethyl groups and $R^2$ and $R^3$ may be the same or different; A is —O— or —NH—; X is chlorine, bromine or iodine; $Y^-$ represents an organic or inorganic anion; and n is 2 or 3.

2. The cement admixture of claim 1, wherein the acrylate polymer has a Tg within the range of 0° to $-30°$ C.

3. The cement admixture of claim 1, wherein the acrylate polymer has a Tg within the range of 0° to $-10°$ C.

4. The cement admixture of claim 1, wherein the monomer of (a) is selected from the group consisting of methyl methacrylate, 2-ethylhexyl acrylate, and butyl acrylate.

5. The cement admixture of claim 1, wherein the monomer of (b) is present in an amount of 1–10%.

6. The cement admixture of claim 5, wherein the monomer is selected from the group consisting of the salts of a dimethylaminopropyl methacrylate adduct with an epihalohydrin, a dimethylaminoethyl metharylate adduct with an epihalohydrin, and a dimethylaminopropyl methacrylate adduct with an epihalohydrin.

7. The cement admixture of claim 6, wherein the epihalohydrin is epichlorohydrin.

8. The cement admixture of claim 6, wherein the salt is the nitrate or chloride salt.

9. The cement admixture of claim 5, wherein the monomer is the nitrate or chloride salt of the adduct of dimethylaminopropylmethacrylate and epichlorohydrin, or of dimethylaminoethyl methacrylate and epichlorohydrin, or of dimethylaminopropyl methacrylamide and epichlorohydrin.

10. The cement admixture of claim 1, wherein the monomer of (c) is selected from the group consisting of styrene, acrylic acid, glycidyl methacrylate, dimethylaminoethyl acrylate, and dimethylaminopropyl methacrylamide.

11. The cement admixture of claim 1, wherein the monomer of (d) is selected from the group consisting of methyl or ethyl acrylate.

12. The cement admixture of claim 1, further comprising sand.

13. The cement admixture of claim 12, for use as mortar, wherein the ratio of cement to sand to aqueous polymer emulson is 1 to 0.5–4.0 to 0.05–0.25.

14. The cement admixture of claim 13, wherein the amount of polymer solids present is about 1–40% based on the cement.

15. The cement admixture of claim 9, for use as a paint, wherein the ratio of cement to sand to aqueous polymer emulsion is 1 to 0–1 to 0.1–1 and wherein the sand, if present, is a fine sand.

16. The cement admixture of claim 15, wherein the amount of polymer solids present is about 25–200% based on the cement.

17. A method for improving the adhesion and flexibility of a cement admixture which comprises the step of adding to the cement an aqueous emulsion of an acrylate polymer with a Tg between below 10° C. and −40° C., the polymer comprising (a) about 25–85% of an acrylate or methacrylate monomer, (b) about 0.5–15% of an alkaline-curable cationic quarternary ammonium salt monomer, (c) 0–70% of a hydrolytically-stable monomer other than (a) or (b), and (d) 0–30% of a hydrolytically-unstable other than (a) or (b), with the percentages being by weight and totaling 100%; wherein the acrylate unit in the polymer and has the formula

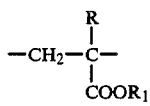

and the alkaline-curable cationic quaternary ammonium unit in the polymer has the formula

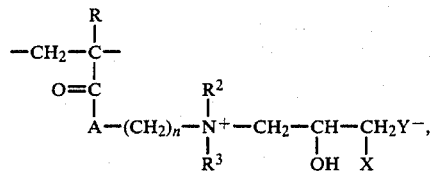

where R is hydrogen or a methyl group; $R^1$ is a $C_1$–$C_{12}$ alkyl group or a $C_6$–$C_{12}$ cycloalkyl group with the proviso that $R^1$ is not a methyl or ethyl group when R is hydrogen; $R^2$ and $R^3$ are methyl or ethyl groups and $R^2$ and $R^3$ may be the same or different; A is —O— or —NH; X is chlorine, bromine or iodine; $Y^-$ represents an organic anion; and n is 2 or 3; the aqueous emulsion being added in an amount sufficient to provide about 1–200% by weight of polymer solids based on the cement solids.

18. The method of claim 17, wherein the acrylate polymer has a Tg within the range of 0° to −30° C.; wherein the monomer of (a) is selected from the group consisting of methyl methacrylate, 2-ethylhexyl acrylate, and butyl acrylate; wherein the monomer of (b) is present in an amount of 1–10% and is selected from the group consisting of the nitrate or chloride salt of a dimethylaminopropyl methacrylate adduct with epichlorohydrin, a dimethylaminoethyl metharylate adduct with epichlorohydrin, and a dimethylaminopropyl methacrylamide adduct with epichlorohydrin; wherein the monomer of (c) is selected from the group consisting of styrene, acrylic acid, glycidyl methacrylate, dimethyaminoethyl acrylate, and dimethylaminopropyl methacrylamide; the aqueous emulsion being added in an amount of about 5–25% when the cement admixture is to be used as a mortar or about 40–100% when the cement admixture is to be used as a paint.

* * * * *

UNITED STATES PATENT AND TRADEMARK OFFICE
CERTIFICATE OF CORRECTION

PATENT NO. : 4,710,526

DATED : December 1, 1987

INVENTOR(S) : Minoru Tokumoto et al.

It is certified that error appears in the above-identified patent and that said Letters Patent are hereby corrected as shown below:

In Claim 1, at line 4, the range which reads "25-85%" should read -- 25-99.5% --.

In Claim 17, at line 5, the range which reads "25-85%" should read -- 25-99.5% --.

Signed and Sealed this

Twenty-sixth Day of July, 1988

Attest:

DONALD J. QUIGG

Attesting Officer

Commissioner of Patents and Trademarks